United States Patent
Inch

(10) Patent No.: US 12,189,405 B2
(45) Date of Patent: Jan. 7, 2025

(54) PRESSURE REGULATOR AND METHOD FOR FLUID PRESSURE REGULATION

(71) Applicant: Coravin, Inc., Bedford, MA (US)

(72) Inventor: Lauren Michelle Inch, Liverpool, NY (US)

(73) Assignee: Coravin, Inc., Bedford, MA (US)

( * ) Notice: Subject to any disclaimer, the term of this patent is extended or adjusted under 35 U.S.C. 154(b) by 0 days.

(21) Appl. No.: 18/453,446

(22) Filed: Aug. 22, 2023

(65) Prior Publication Data

US 2023/0409055 A1 Dec. 21, 2023

Related U.S. Application Data

(62) Division of application No. 17/959,703, filed on Oct. 4, 2022, now Pat. No. 11,782,462.

(60) Provisional application No. 63/253,871, filed on Oct. 8, 2021.

(51) Int. Cl.
| | |
|---|---|
| *G05D 16/00* | (2006.01) |
| *F16K 17/24* | (2006.01) |
| *G05D 16/04* | (2006.01) |
| *G05D 16/10* | (2006.01) |

(52) U.S. Cl.
CPC ............ *G05D 16/024* (2019.01); *F16K 17/24* (2013.01); *G05D 16/103* (2013.01); *G05D 16/0402* (2019.01); *Y10T 137/7795* (2015.04)

(58) Field of Classification Search
CPC .......... G05D 16/0402; Y10T 137/7795; Y10T 137/7808
See application file for complete search history.

(56) References Cited

U.S. PATENT DOCUMENTS

| | | | |
|---|---|---|---|
| 3,472,292 A | 10/1969 | Godfrey | |
| 4,450,858 A * | 5/1984 | Acomb | .............. G05D 16/0663 137/484.8 |
| 4,867,209 A | 9/1989 | Santoiemmo | |
| 7,080,655 B2 | 7/2006 | Jacksier et al. | |
| 7,293,574 B2 | 11/2007 | Schwartz et al. | |
| 7,334,598 B1 | 2/2008 | Hollars | |
| 9,310,812 B2 | 4/2016 | Costle et al. | |

(Continued)

FOREIGN PATENT DOCUMENTS

| | | |
|---|---|---|
| WO | WO 2015/026436 A2 | 2/2015 |
| WO | WO 2017/180750 A1 | 10/2017 |

OTHER PUBLICATIONS

Invitation to Pay Additional Fees and Communication Relating to the Results of the Partial International Search Report mailed Jan. 16, 2023 for International Application No. PCT/US2022/045997.

(Continued)

*Primary Examiner* — Robert K Arundale
(74) *Attorney, Agent, or Firm* — Wolf, Greenfield & Sacks, P.C.

(57) ABSTRACT

A gas regulator includes a valve chamber body that houses two valves of the regulator. Valve elements that move to open and close the two valves are received via a same opening into the valve chamber body, which is closed by a plug. The plug can define a first valve seat as well as a piercing element used to pierce a compressed gas cylinder. A retainer can hold a gasket at a valve seat as well as provide a bore or other support for a valve element and valve element spring.

20 Claims, 2 Drawing Sheets

(56) References Cited

U.S. PATENT DOCUMENTS

| | | |
|---|---|---|
| 9,678,515 B2 | 6/2017 | Lapena-Rey et al. |
| 9,828,227 B2 | 11/2017 | Dalton et al. |
| 11,782,462 B2 | 10/2023 | Inch |
| 2006/0157122 A1* | 7/2006 | Kawamura ............ G05D 16/103 137/613 |
| 2011/0155267 A1* | 6/2011 | Nicolini ................. F17C 13/04 137/511 |
| 2013/0255791 A1 | 10/2013 | Nashery et al. |
| 2014/0102560 A1* | 4/2014 | Costle .................. G05D 16/106 137/505.12 |
| 2019/0179348 A1* | 6/2019 | Gessler ................ G05D 16/107 |

OTHER PUBLICATIONS

International Search Report and Written Opinion mailed Mar. 13, 2023 for International Application No. PCT/US2022/045997.

* cited by examiner

PRESSURE REGULATOR AND METHOD FOR FLUID PRESSURE REGULATION

RELATED APPLICATIONS

This Application is a Division of U.S. application Ser. No. 17/959,703, filed Oct. 4, 2022, which claims priority under 35 U.S.C. § 119 (e) to U.S. Provisional Application No. 63/253,871, filed Oct. 8, 2021, which are herein incorporated by reference in its entirety.

FIELD OF INVENTION

This invention relates to pressure regulators, such as a multi-stage gas pressure regulator used to adjust an input gas at a relatively high pressure to output gas at a relatively lower pressure.

SUMMARY

Aspects of the invention relate to a pressure regulator, such as a regulator that receives relatively high pressure gas, e.g., at 1000 to 3000 psi, and outputs gas at a lower pressure, such as psi. In some embodiments, a regulator can be employed with compressed gas cylinders, such as a cylinder that contains liquid carbon dioxide, and may be included as part of a gas delivery device, such as a tire inflation device, a beverage dispensing apparatus, or other pneumatic or hydraulic device that uses a pressure-regulated fluid source.

In some aspects, a pressure regulator includes a valve chamber body defining a cavity that extends from a first opening at a first end of the valve chamber body to a second opening at a second end of the valve chamber body. The valve chamber body can define a second valve seat in the cavity adjacent the second opening, e.g., opposite the first opening. A second stage valve element can be configured to be received into the cavity via the first opening and movable in the cavity to open and close a second stage valve at the second valve seat. In addition, a first stage valve element can be configured to be received into the cavity via the first opening and movable in the cavity to open and close a first stage valve to thereby control flow of pressurized gas into the cavity. By configuring the first and second stage valve elements to be receivable into the valve chamber body via a common opening into a cavity of the valve chamber body, manufacture and assembly of the regulator can be simplified.

In some embodiments, a plug can be engaged at the first end of the valve chamber body, with the plug defining a first valve seat that is contacted by the first stage valve element to open and close the first stage valve. In some cases, the first valve seat can be on an inner side of the plug in the cavity, and the plug can include a piercing element located on an outer side of the plug outside of the cavity and configured to pierce a gas outlet of a gas cylinder. The plug can have a gas pathway extending from the piercing element to the first valve seat, e.g., so gas received from a gas cylinder or other source at the piercing element can be delivered to the first valve seat. In some cases, the plug defines a first bore in which the first valve seat is located, and a portion of the first stage valve element can be slidingly moveable in the first bore relative to the first valve seat. In some embodiments, the first stage valve element can be sealingly engaged with the first bore to form and maintain a gas-tight seal throughout a range of motion of the first stage valve element relative to the first bore. In addition, or alternately, the first stage valve element can in some embodiments be sealingly engaged with an inner surface of the cavity to form and maintain a gas-tight seal throughout a range of motion of the first stage valve element relative to the valve chamber body.

In some cases, a first stage spring can be configured to bias the first stage valve element toward the second end of the valve chamber body and to open the first stage valve. In some cases, gas pressure in the cavity can urge the first stage valve element to move against the bias of the first stage spring and toward the first end of the valve chamber body to close the first stage valve.

In some embodiments, a retainer can be received in the cavity and define a second bore in which the second stage valve element is movable relative to the second valve seat. A second stage spring can be provided in the second bore and be configured to bias the second stage valve element toward the second valve seat and to close the second stage valve. In some cases, a second valve gasket can be configured to engage the second stage valve element and form a seal to close the second stage valve. The retainer can be configured to hold the second valve gasket in contact with the valve chamber body near the second valve seat. In some embodiments, the second stage valve element can include a ball, and the first stage valve element can include a piston.

In some embodiments, a second stage piston can be arranged for movement relative to the valve chamber body to open and close the second stage valve. The second stage piston can have an inner side and an outer side, with a portion of the valve chamber body being received at the inner side of the second stage piston. In some cases, the second stage piston can include a plunger configured to extend into the second opening to contact the second valve element to open the second stage valve. A second stage piston spring can be configured to bias the second stage piston to open the second stage valve. Gas pressure at the inner side of the second stage piston can urge the second stage piston to move against the bias of the second stage piston spring and to close the second stage valve. The second stage piston, second stage piston spring and valve chamber body can be located within a housing.

In some aspects, a pressure regulator includes a valve chamber body defining a cavity that extends from a first opening at a first end of the valve chamber body, and a plug engaged at the first end of the valve chamber body. The plug can define a first valve seat on an inner side of the plug in the cavity and have a piercing element located on an outer side of the plug outside of the cavity and configured to pierce a gas outlet of a gas cylinder. A gas pathway can extend from the piercing element to the first valve seat. A first stage valve element can be movable in the cavity to engage with and disengage from the first valve seat and thereby to open and close a first stage valve to control flow of pressurized gas into the cavity. By providing the plug with both a piercing element and the first valve seat, the regulator can be made more compact and the number of components exposed to high gas pressures reduced.

In some embodiments, the plug can define a first bore in which the first valve seat is located, and a portion of the first stage valve element can be slidingly moveable in the first bore relative to the first valve seat, e.g., to open and close the first stage valve. In some cases, the first stage valve element is sealingly engaged with the first bore to form and maintain a gas-tight seal throughout a range of motion of the first stage valve element relative to the first bore. In addition or alternatively, the first stage valve element can be sealingly engaged with an inner surface of the cavity to form and maintain a gas-tight seal throughout a range of motion of the first stage valve element relative to the valve chamber body.

In some embodiments, a first stage spring can be configured to bias the first stage valve element toward the second end of the valve chamber body and to open the first stage valve. Gas pressure in the cavity can urge the first stage valve element to move against the bias of the first stage spring and into contact with the first valve seat to close the first stage valve.

In some embodiments, the cavity can extend from the first opening to a second opening at a second end of the valve chamber body, with the valve chamber body defining a second valve seat in the cavity adjacent the second opening. A second stage valve element can in some embodiments be received into the cavity and be movable in the cavity to open and close a second stage valve at the second valve seat.

In some cases, a retainer can be received in the cavity and define a second bore in which the second stage valve element is movable relative to the second valve seat. A second stage spring can be received in the second bore and configured to bias the second stage valve element toward the second valve seat and to close the second stage valve. A second valve gasket can be configured to engage the second stage valve element and form a seal to close the second stage valve, and the retainer can be configured to hold the second valve gasket in contact with the valve chamber body near the second valve seat. In some cases, the first stage valve element and the second stage valve element can be received into the cavity via the first opening.

In some cases, a second stage piston can be arranged for movement relative to the valve chamber body to open and close the second stage valve, with the second stage piston having an inner side and an outer side, and a portion of the valve chamber body being received at the inner side of the second stage piston. In some cases, the second stage piston includes a plunger configured to extend into the second opening to contact the second valve element to open the second stage valve. A second stage piston spring can be configured to bias the second stage piston to open the second stage valve. Gas pressure at the inner side of the second stage piston can urge the second stage piston to move against the bias of the second stage piston spring and to close the second stage valve. The second stage piston, second stage piston spring and valve chamber body can be located in a housing.

Various exemplary embodiments of the device are further depicted and described below.

BRIEF DESCRIPTION OF THE DRAWINGS

Embodiments are described with reference to the figures, which include.

DETAILED DESCRIPTION

Aspects of the invention are described below with reference to illustrative embodiments, but it should be understood that aspects of the invention are not to be construed narrowly in view of the specific embodiments described. Thus, aspects of the invention are not limited to the embodiments described herein. It should also be understood that various aspects of the invention may be used alone and/or in any suitable combination with each other, and thus various embodiments should not be interpreted as requiring any particular combination or combinations of features. Instead, to the extent not mutually exclusive, one or more features of the embodiments described may be combined with any other suitable features. For example, some aspects are described in which a first and second stage valve element can be provided through a same opening into a valve body cavity, and other aspects are described regarding a plug for a valve body cavity that includes both a first stage valve seat and a piercing element. These aspects can be employed together in a regulator or other valve configuration, or individually. Similarly, aspects are described regarding a gasket retainer that defines a bore or otherwise supports a valve element and spring as well as holds a gasket at a valve seat. This aspect can likewise be employed alone in a regulator or other valve, or in combination with other aspects.

Figure 1:
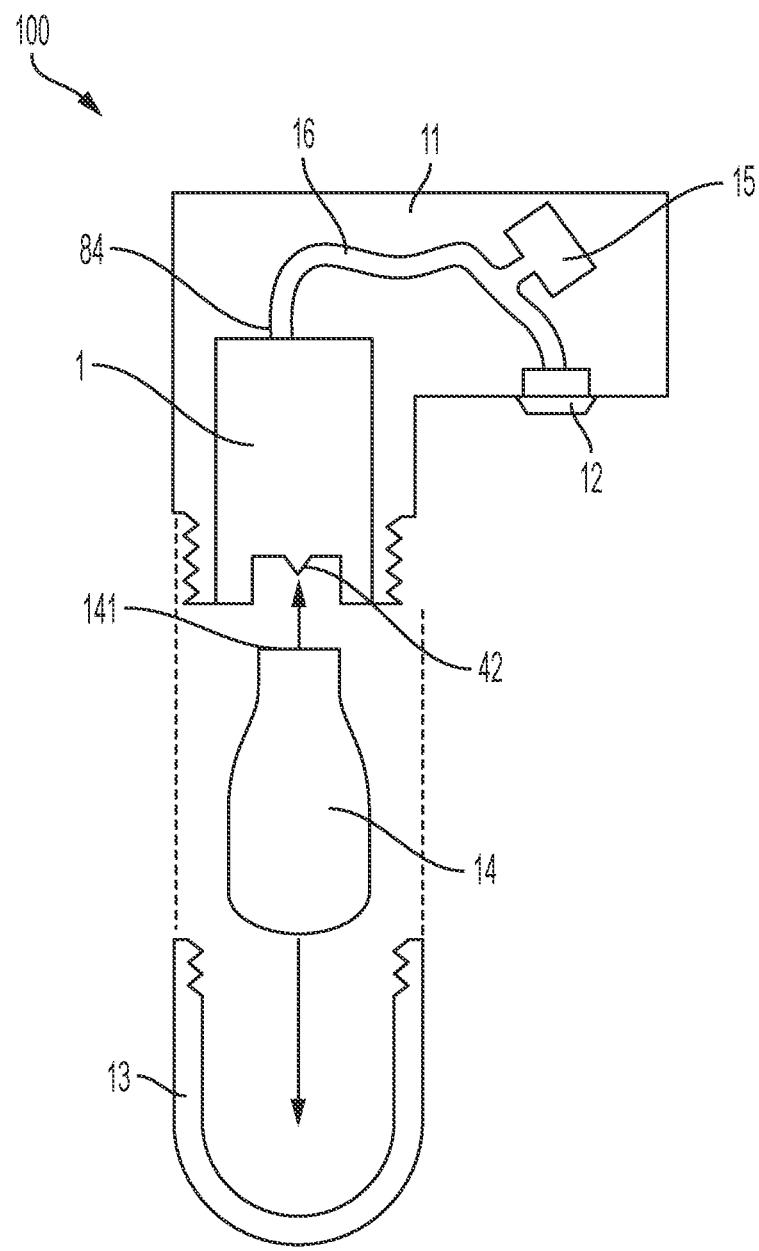
FIG. 1 shows a schematic diagram of a gas delivery device that includes a regulator including features described herein.

FIG. 1 shows a schematic view of a gas delivery device 100 which can receive and use pressurized gas for any suitable purpose, such as inflating tires, life vests or other items, pressurizing or repressurizing a sparkling beverage container, providing pressurized gas into a wine bottle to force wine to flow from the bottle, and so on. The device 100 includes a regulator 1 that can have one or more features described herein. The regulator 1 can be fluidly coupled to a pressurized gas cylinder 14 or other suitable pressurized gas source, such as a hose or fitting that is connected to a container holding pressurized gas. The pressurized gas source can provide gas at a relatively high pressure, such as 1000 psi or more, to the regulator 1. In some embodiments, the regulator 1 can have a piercing lance or element 42 that can penetrate or puncture a metal cap or other gas outlet 141 of the gas cylinder 14 when the gas outlet 141 and piercing element 42 are forced into engagement. The cylinder 14 and piercing element 42 can be urged into engagement in different ways, such as by a linkage, lever, hydraulic ram, etc. In some embodiments, the gas cylinder 14 can be received into a holder 13 which is configured to engage with the regulator 1 or other portion of the device housing 11 so as to force the cylinder 14 into engagement with the regulator 1. For example, the holder 13 can threadedly engage with the device housing 11 so that tightening the holder 13 onto the housing 11 causes the gas outlet 141 to be forced onto the piercing element 42 so the outlet 141 is opened and pressurized gas is delivered to the piercing element 42. The regulator 1 can reduce a pressure of gas received from the cylinder 14 or other gas source, e.g., from a pressure of 1000 to 3000 psi or more, and output gas at a desired pressure such as 5 to 50 psi. An outlet 84 of the regulator 1 can be fluidly coupled to a gas conduit 16 which can conduct pressurized gas output from the regulator 1 to any suitable portion of the device 100, such as a gas outlet 12 of the device 100. The gas outlet 12 can have a valve that is normally closed but can be opened to release pressurized gas for receipt by another item, such as a bicycle tire. For example, the gas outlet 12 can be pressed into contact with a valve stem or other part of an item receiving pressurized gas, which causes the valve to open and pressurized gas to be delivered to the item. An indicator 15 can provide an indication of gas pressure in the conduit 16, such as by displaying a numerical or otherwise visible indication of pressure in the conduit 16. This pressure indication can indicate the pressure being output from the regulator 1 and/or a pressure of an item (such as a tire or bottle) that is fluidly coupled to the gas outlet 12 and receives pressurized gas from the device 100. FIG. 1 shows merely one example device 100 that can employ a regulator 1 including features described herein, and it should be understood that a regulator 1 can be employed in any suitable device and for any suitable purpose.

Figure 2:
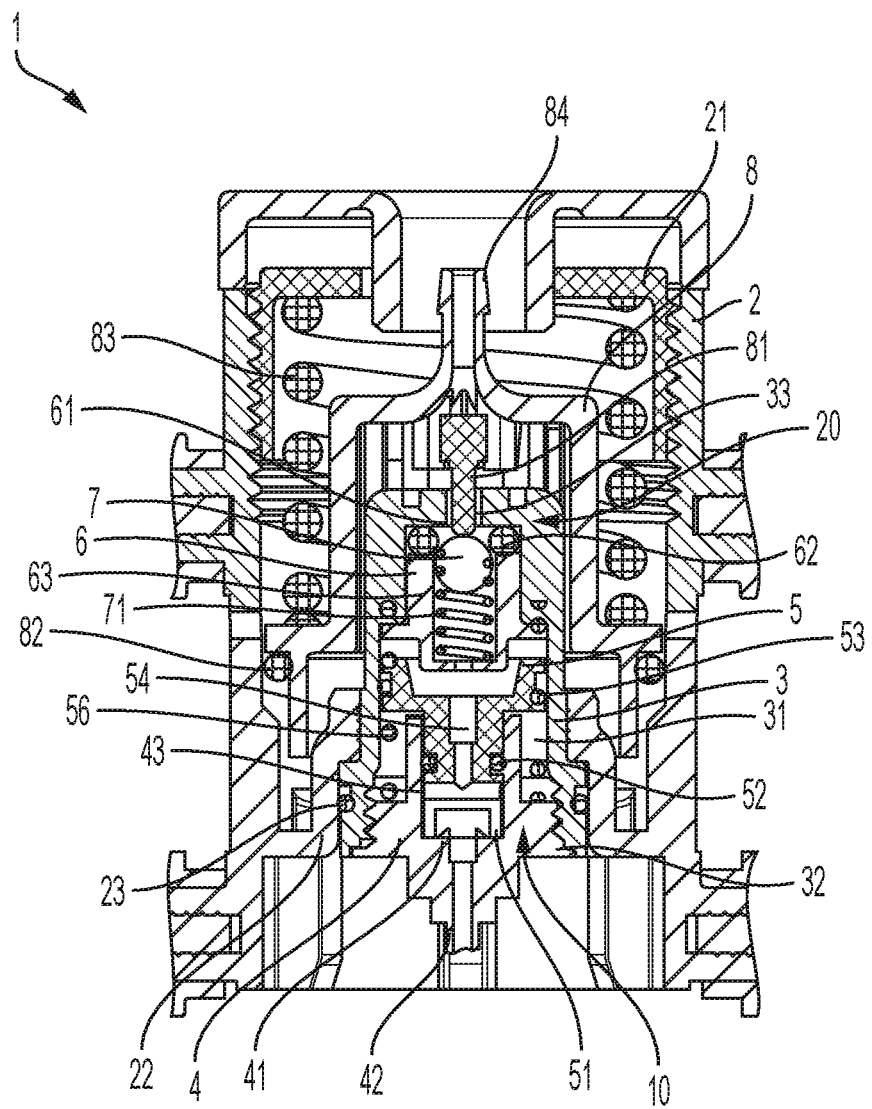
FIG. 2 shows a cross sectional side view of a multi-stage fluid pressure regulator in an illustrative embodiment.

FIG. 2 illustrates a cross sectional view of a two stage pressure regulator 1 that incorporates one or more features described herein. In some embodiments, the pressure regulator 1 has two stages to adjust a pressure of gas output by the regulator 1. For example, FIG. 1 shows a first stage 10 and a second stage 20 that operate to reduce the pressure from a gas cylinder 14 (which may output gas at approximately 2600-3000 psi or more, or less) which is received at a piercing element 42. The first stage 10 may reduce the pressure of gas received from the gas cylinder 14 to a first level, e.g., in a range of 30-60 psi, while the second stage 20 may reduce the pressure of gas received from the first stage 10 to a yet lower level, e.g., in a range of 15-30 psi, that is provided at a gas outlet 84 of the regulator 1. While the embodiment in FIG. 2 includes two stages for pressure regulation, the regulator 1 can be implemented as a single stage or three or more stage regulator. Also, although embodiments described herein are used with a pressurized gas cylinder containing carbon dioxide (CO2) gas, other pressurized gases or fluids such as argon, nitrogen or oxygen could be used, as well as other types of gas sources such as gas containers that have an operable valve at the outlet rather than a piercable gas outlet 141.

In some embodiments, the regulator 1 can have a valve chamber body 3 that contains two valves of the regulator, e.g., both first and second stage valves 10, 20 or a first stage valve 10 and an on/off outlet valve 20. This can provide a compact arrangement and/or easier assembly of the regulator 1. For example, the valve chamber body 3 can define a cavity 31 that extends from a first opening 32 at a first end of the valve chamber body 3 to a second opening 33 at a second end of the valve chamber body. Both a first stage valve element 5 and a second stage valve element 6 can be received into the cavity 31 via the first opening 32, and the first opening 32 can be covered by a plug 4 that engages the valve chamber body 3 at the first end and captures the first and second stage valve elements in the cavity 31. During assembly of the regulator 1, the second stage valve element 6 can be provided first into the cavity 31, followed by the first stage valve element 5 and then engagement of the plug 4 with the valve chamber body 3. The first stage valve element 5 can be movable in the cavity 31 to open and close the first stage valve 10, and the second stage valve element 6 can be movable in the cavity 31 to open and close the second stage valve 20. In some embodiments, the plug 4 can define a first valve seat 41, and the first stage valve element 5 can move in the cavity 31 toward and away from the first valve seat 41 to open and close the first stage valve 10 and thereby control flow of pressurized gas from the piercing element 42 into the cavity 31. For example, the first stage valve element 5 can move toward the first valve seat 41 so a portion of the first stage valve element 5 contacts the first valve seat 41 to close the first stage valve 10, and can move away from and out of contact with the first valve seat 41 to allow gas flow through the first valve seat 41. In some embodiments, the valve chamber body 3 can define a second valve seat 61 in the cavity 31 adjacent the second opening 33, and the second stage valve element 6 can move toward and away from the second valve seat 61 to open and close the second stage valve 20. For example, the second stage valve element 6 can move toward and into contact with the second valve seat 61 to close the second stage valve 20, and can move away from and out of contact with the second valve seat 61 to open the second stage valve 20.

In some embodiments, the plug 4 can define both the first valve seat 41 and the piercing element 42 (or other feature) that receives high pressure gas. For example, the first valve seat 41 can be on an inner side of the plug 4 in the cavity 31, and the piercing element 42 can be located on an outer side of the plug 4 outside of the cavity 31. A gas pathway can extend from the piercing element 42 to the first valve seat 41 so high pressure gas received from a gas cylinder at the piercing element 42 can be routed to the first valve seat 41. This arrangement can help reduce the need to make portions of the regulator 1 other than the plug 4 resistant to relatively high pressures (e.g., 1000-3000 psi), e.g., because only the plug 4 and a portion of the first stage valve element 5 that covers the first valve seat 41 when the first stage valve 10 is closed is subjected to such pressures. This is in contrast to regulators that have high pressure gas contained in a chamber in which a first or other stage valve element is moved to open and close a first stage valve. In embodiments such as that in FIG. 2, high pressure gas (e.g., at the level output from the gas cylinder 14 or other source) is located only in the gas pathway of the plug 4 that extends from the piercing element 42 to the first valve seat 41. Note that the feature of a plug 4 that defines both a first stage valve seat and a piercing element need not be employed with a two stage regulator or a regulator that has the particular features shown in FIG. 2. Instead, this feature could be employed with a single stage regulator and regulators that have a different valve or other configuration than that shown in FIG. 2. For example, the second stage valve 20 could be configured to be manually opened/closed by a user rather than having a pressure regulation function.

Although not required, the plug 4 can define a first bore 43 in which the first valve seat 41 is located. A portion of the first stage valve element 5 can be slidingly moveable in the first bore 43 relative to the first valve seat 41, e.g., to slide up and down along the length of the first bore 43 as viewed in FIG. 2. A seal 52 can be provided between the first stage valve element 5 and the first bore 43 so the first stage valve element 5 is sealingly engaged with the first bore 43 to form and maintain a gas-tight seal throughout a range of motion of the first stage valve element 5 relative to the first bore 43. For example, the portion of the first stage valve element 5 in the first bore 43 can move to open and close the first stage valve 10 while constantly maintaining a seal with the first bore 43, e.g., so that gas released by the first stage valve 10 enters the gas pathway 54 through the first stage valve element 5 rather than exiting through a space between the first bore 43 and the portion of the first stage valve element 5 in the first bore 43. The first stage valve element 5 can also be sealingly engaged with an inner surface of the cavity 31 to form and maintain a gas-tight seal throughout a range of motion of the first stage valve element 5 relative to the valve chamber body 3. For example, a seal 53 can be provided between the first stage valve element 5 and the inner surface of the cavity 31 that maintains sealing engagement between the first stage valve element 5 and the valve chamber body 3 as the first stage valve element 5 moves to open and close the first stage valve 10. As a result, gas exiting the gas pathway 54 at an upper end of the first stage valve element 5 cannot flow downwardly into a space between the first stage valve element 5 and the valve chamber body 3 because such flow is prevented by the seal 53. Thus, gas pressure in a space above the first stage valve element 5 will be trapped unless released by the second stage valve 20. This gas pressure in the cavity 31 above the first stage valve element 5 urges the first stage valve element 5 to move downwardly and contact the first valve seat 41 to close the first stage valve 10. For example, the gas pathway 54 through the first stage valve element 5 can extend initially radially inwardly at a location above a distal end of the first stage valve element 5 that contacts the first valve seat 41. From the radially inward portion, the gas pathway 54 extends axially upwardly and away from the first valve seat 41 to an upper portion of the first stage valve element 5 at which a concave shape is formed. Gas pressure at the upper end of the gas pathway 54, e.g., at the concave shape, exerts a downward force on the first stage valve element 5 to close the first stage valve 10. Conversely, the first stage valve element 5 is biased upwardly, i.e., to move away from the first valve seat 41 and open the first stage valve 10, by a first stage spring 56. The first stage spring 56 is positioned between the plug 4 and the upper portion of the first stage valve element 5 and urges the portion of the first stage valve element 5 in the first bore 43 to move away from the first valve seat 41. The balance of forces exerted on the first stage valve element 5 by the first stage spring 56 and gas pressure at the upper end of the first stage valve element 5 effects the pressure regulation function of the first stage valve 10. When the bias of the first stage spring 56 is greater than the gas pressure force urging the first stage valve element to move downwardly, the first stage valve 5 will be opened and pressurized gas is allowed to flow into the gas pathway 54. Conversely, when the gas pressure force urging the first stage valve element 5 to move downwardly and close the first stage valve 10 is greater than the first stage spring 56 force, the first stage valve 10 will close. As will be understood, the spring rate of the first stage spring 56 and size/shape of the first stage valve element 5 can be configured to provide the desired gas pressure output by the first stage valve 10.

Gas flows from the gas pathway 54 of the first stage valve element 5 to the second stage valve 20. In some embodiments, a retainer 6 is received in the cavity 31 (e.g., via the first opening 32) and defines a second bore 63 in which the second stage valve element 7 is movable relative to the second valve seat 61. A second stage spring 71 can be provided in the second bore 63 to bias the second stage valve element 7 toward the second valve seat 61 and to close the second stage valve 20. A second valve gasket 62 can be configured to engage the second stage valve element 7 and form a seal to close the second stage valve 20, e.g., when the bias of the second stage spring 71 and gas pressure in the second bore 63 on the second stage valve element 7 urges the element 7 toward the second valve seat 61. Engagement of the second stage valve element 7 with the gasket 62 can form a seal that closes the second stage valve 20. In some embodiments, gas pressure in the second bore 63 and force of the second stage spring 71 can cause the second stage valve element 7 into contact with the second valve seat 61 to form a second seal in addition to the seal between the second stage valve element 7 and the gasket 62. This may help extend the life of the gasket 62, e.g., because the second valve seat 61 and the second stage valve element 7 may be relatively rigid and maintain a seal without deformation of the seat 61 and element 7. This may limit the extent to which the gasket 62 is required to deform and resist the closing force of the second stage valve element 7 while the second stage valve 20 is held closed. In other words, the second valve seat 61 can limit the motion of the second valve element 7 during inoperative periods and high-pressure situations such that gasket 62 is prevented from overdeformation and/or permanent deformation, i.e., the first valve seat 61 supports the second stage valve element 7 when the second stage valve 20 is closed, thereby enabling long-term containment of unused gas. Additionally, this design of a supportive valve seat enables extremely high pressures and pressure shocks to be reliably contained within the valve chamber body 3 as is the case upon piercing a compressed gas cartridge where initial cartridge lancing can slam the first and second stage valves 10, 20 with high pressure gas. Additional benefits of a rigid valve seat limiting travel of the valve element allows the valve assembly to handle cold and hot temperatures as well as temperature swings during service, thereby affecting gasket hardness as is common when harnessing high-pressure compressed gas cylinders, particularly at high flow rates where the gas is cool due to its changing from a substantially liquid phase in the cylinder to a gaseous phase upon exiting the cylinder. The controlled limited compression of the gasket 62 prevents the gasket from taking a permanent compression set, yet allows for a reliable seal.

In some embodiments, the retainer 6 can be configured to hold the second valve gasket 62 in contact with the valve chamber body 3 near the second valve seat 61 or otherwise hold the gasket 62 in position to form a suitable seal with the second stage valve element 7. For example, an upper end of the retainer 6 can contact a lower side of the gasket 62 and hold the gasket 62 in place when the second stage valve 20 is open and/or closed. Note that the feature of a retainer employed to hold a gasket at a valve seat as well as provide a bore for or otherwise support a valve element movable to open and close the valve at the valve seat and a spring to bias the valve element can be employed alone in any suitable valve configuration and need not be combined with other features described herein. During assembly, the second valve gasket 62 can be introduced first into the cavity 31 and positioned adjacent the second valve seat 61. Thereafter, the second stage valve element 7 and second stage spring 71 can be provided into the second bore 63 and the assembled second stage valve element 7, spring 71 and retainer 6 can be provided into the cavity 31. The retainer 6 can be press fit, adhered, fastened or otherwise fixed in place in the cavity 31, e.g., by engaging an outer surface of the retainer 6 with the inner wall of the cavity 31. The retainer 6 can have an opening at a lower end of the second bore 63 that permits gas to flow from the gas pathway 54 into the second bore 63, but is small enough to ensure that the spring 71 and/or valve element 7 are retained in the second bore 63. The retainer 6 can have a boss or protruding portion that defines a lower end of the second bore 63, and the first stage valve element 5 can be arranged to receive at least a portion of the boss, e.g., the boss can be received into the concave shape at an upper end of the first stage valve element 5. This arrangement can provide for a more compact design, e.g., that has a relatively short length in the direction along which the first stage valve element 5 moves to open and close the first stage valve 10.

To open the second stage valve 20, force must be applied on the second stage valve element 7 to move the element 7 away from contact with the second valve seat 61 (and gasket 62 if provided). This can be done in different ways, such as by having a user operable button, lever or other element by which a user can move the second stage valve element 7 downwardly and out of contact with the second valve seat 61/gasket 62. In such a case, the pressure of gas output by the regulator 1 will not be regulated by the second stage valve 20, but only by the first stage valve 10. The opening at a lower end of the second bore 63 of the retainer 6 or other portion of the regulator 1 can be configured to resist flow of gas, e.g., operate as a flow restrictor, and so allow a pressure to be established in the space between the retainer 6 and the first stage valve element 5 suitable to close the first stage valve 10 and regulate the gas pressure output even if the second stage valve 20 is constantly open. In some embodiments, the second stage valve 20 can be operated to regulate the gas pressure output from the valve 20. For example, as shown in FIG. 2, a second stage piston 8 can be arranged for movement relative to the valve chamber body 3 to open and close the second stage valve 20. The second stage piston 8 can have an inner side (e.g., that defines a cavity or space into which a portion of the valve chamber body 3 can be received), and an outer side. The second stage piston 8 can have a plunger 81 at the inner side configured to extend into the second opening 33 to contact the second valve element 7 to open the second stage valve 20, e.g., when the second stage piston 8 is moved downwardly or toward the valve chamber body 3. The plunger 81 can have a convex end that contacts the second stage valve element 7, which can provide advantages, especially if the valve element 7 is configured as a spherical ball. The convex end of the plunger 81 can cause the ball element 7 to move in approximately random directions when opening, thereby avoiding excessive wear areas on the seat 61 or gasket 62. Gas pressure at the inner side of the second stage piston 8 urges the piston 8 to move upwardly and to allow the second stage valve 20 to close. (A seal 82 between a portion of the outer side of the piston 8 and an inner wall of the regulator housing 2 prevents gas from flowing out from the inner side of the piston 8; thus gas released from the second stage valve 20 will be trapped at the inner side of the piston 8 unless released via the gas outlet 84.) On the other hand, a second stage piston spring 83 biases the second stage piston 8 to move downwardly to open the second stage valve 20. The force of the second stage piston spring 83 on the piston 8 can be adjusted by rotating a cap 21 that is threadedly engaged with the regulator housing 2. As will be understood, the balance of force of the second stage piston spring 83 and the pressure at the inner side of the piston 8 will control the pressure of gas output by the second stage valve 20.

In some embodiments, including those described above, the first stage valve element 5 includes a piston and the second stage valve element 7 includes a ball, e.g., as shown in FIG. 2. However, the valve elements are not limited to these arrangements and can be configured in other ways. The valve chamber body 3 can be supported by the regulator housing 2 by inserting the second end of the valve chamber body 3 (where the second opening 33 is located) into a receiving opening 22 of the housing 2. The body 3 can engage the receiving opening 22 by friction or interference fit, adhesive, fasteners, threaded engagement, etc. A seal 23 can be provided between the housing 2 and the body 3, e.g., to help prevent gas pressure from leaking from an inner side of the piston 8. The valve chamber body 3 and receiving opening 22 can have a step feature, e.g., a change in diameter or other size, so that the body 3 can be positioned reliably with respect to the housing 2. This can help ensure that the piston 8 can properly interact with the second stage valve element 7. The gas outlet 84 of the regulator 1 can be attached to a flexible hose, coupling or other arrangement to receive gas from the regulator 1. The coupling may include a feature that permits the gas outlet 84 to move relative to the housing 2, e.g., because the gas outlet 84 extends from the piston 8, which is movable to control opening and closing of the second stage valve 20.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A pressure regulator comprising:
 a valve chamber body defining a cavity that extends from a first opening at a first end of the valve chamber body to a second opening at a second end of the valve chamber body, the valve chamber body defining a second valve seat in the cavity adjacent the second opening;
 a plug engaged at the first end of the valve chamber body, the plug defining a first valve seat on an inner side of the plug in the cavity and having a piercing element located on an outer side of the plug outside of the cavity and configured to pierce a gas outlet of a gas cylinder, the plug having a gas pathway extending from the piercing element to the first valve seat;
 a first stage valve element movable in the cavity to engage with and disengage from the first valve seat and thereby to open and close a first stage valve to control flow of pressurized gas into the cavity; and
 a second stage valve element received into the cavity and movable in the cavity to open and close a second stage valve at the second valve seat,
 wherein the second stage valve element is movable toward the first valve seat to open the second stage valve.

2. The regulator of claim 1, wherein the plug defines a first bore in which the first valve seat is located, and wherein a portion of the first stage valve element is slidingly moveable in the first bore relative to the first valve seat.

3. The regulator of claim 2, wherein the first stage valve element is sealingly engaged with the first bore to form and maintain a gas-tight seal throughout a range of motion of the first stage valve element relative to the first bore.

4. The regulator of claim 1, wherein the first stage valve element is sealingly engaged with an inner surface of the cavity to form and maintain a gas-tight seal throughout a range of motion of the first stage valve element relative to the valve chamber body.

5. The regulator of claim 4, further comprising a first stage spring configured to bias the first stage valve element toward the second end of the valve chamber body and to open the first stage valve.

6. The regulator of claim 5, wherein gas pressure in the cavity urges the first stage valve element to move against the bias of the first stage spring and into contact with the first valve seat to close the first stage valve.

7. The regulator of claim 1, wherein the plug defines a first bore in which the first valve seat is located, wherein a portion of the first stage valve element is slidingly moveable in the first bore relative to the first valve seat, and wherein the first stage valve element is sealingly engaged with an inner surface of the cavity to form and maintain a gas-tight seal throughout a range of motion of the first stage valve element relative to the valve chamber body.

8. The regulator of claim 7, wherein the portion of the first stage valve element is sealingly engaged with the first bore to form and maintain a gas-tight seal throughout a range of motion of the first stage valve element relative to the first bore.

9. The regulator of claim 1, wherein the first stage valve element and the second stage valve element are received into the cavity via the first opening.

10. The regulator of claim 9, further comprising a retainer received in the cavity and defining a second bore in which the second stage valve element is movable relative to the second valve seat.

11. A pressure regulator comprising:
a valve chamber body defining a cavity that extends from a first opening at a first end of the valve chamber body to a second opening at a second end of the valve chamber body, the valve chamber body defining a second valve seat in the cavity adjacent the second opening;
a plug engaged at the first end of the valve chamber body, the plug defining a first valve seat on an inner side of the plug in the cavity and having a piercing element located on an outer side of the plug outside of the cavity and configured to pierce a gas outlet of a gas cylinder, the plug having a gas pathway extending from the piercing element to the first valve seat;
a first stage valve element movable in the cavity to engage with and disengage from the first valve seat and thereby to open and close a first stage valve to control flow of pressurized gas into the cavity;
a second stage valve element received into the cavity and movable in the cavity to open and close a second stage valve at the second valve seat; and
a retainer received in the cavity and defining a second bore in which the second stage valve element is movable relative to the second valve seat.

12. The regulator of claim 11, further comprising second stage spring in the second bore configured to bias the second stage valve element toward the second valve seat and to close the second stage valve.

13. The regulator of claim 11, further comprising a second valve gasket configured to engage the second stage valve element and form a seal to close the second stage valve, the retainer configured to hold the second valve gasket in contact with the valve chamber body near the second valve seat.

14. The regulator of claim 11, wherein the first stage valve element and the second stage valve element are received into the cavity via the first opening.

15. The regulator of claim 11, further comprising a second stage piston arranged for movement relative to the valve chamber body to open and close the second stage valve, the second stage piston having an inner side and an outer side, a portion of the valve chamber body being received at the inner side of the second stage piston.

16. A pressure regulator comprising:
a valve chamber body defining a cavity that extends from a first opening at a first end of the valve chamber body to a second opening at a second end of the valve chamber body, the valve chamber body defining a second valve seat in the cavity adjacent the second opening;
a plug engaged at the first end of the valve chamber body, the plug defining a first valve seat on an inner side of the plug in the cavity and having a piercing element located on an outer side of the plug outside of the cavity and configured to pierce a gas outlet of a gas cylinder, the plug having a gas pathway extending from the piercing element to the first valve seat;
a first stage valve element movable in the cavity to engage with and disengage from the first valve seat and thereby to open and close a first stage valve to control flow of pressurized gas into the cavity;
a second stage valve element received into the cavity and movable in the cavity to open and close a second stage valve at the second valve seat; and
a second stage piston arranged for movement relative to the valve chamber body to open and close the second stage valve, the second stage piston having an inner side and an outer side, a portion of the valve chamber body being received at the inner side of the second stage piston;
wherein the second stage piston includes a plunger configured to extend into the second opening to contact the second valve element to open the second stage valve.

17. The regulator of claim 16, further comprising a retainer received in the cavity and defining a second bore in which the second stage valve element is movable relative to the second valve seat.

18. The regulator of claim 16, further comprising a second stage piston spring configured to bias the second stage piston to open the second stage valve.

19. The regulator of claim 18, wherein gas pressure at the inner side of the second stage piston urges the second stage piston to move against the bias of the second stage piston spring and to close the second stage valve.

20. The regulator of claim 18, further comprising a housing in which the second stage piston, second stage piston spring and valve chamber body are located.

* * * * *